United States Patent [19]
Englund

[11] Patent Number: 5,657,825
[45] Date of Patent: Aug. 19, 1997

[54] COUPLING DEVICE AT A TRACTOR

[76] Inventor: Lars Englund, Fagerslätt, S-560 27, Tenbult, Sweden

[21] Appl. No.: 615,190

[22] PCT Filed: Oct. 6, 1994

[86] PCT No.: PCT/SE94/00931

§ 371 Date: Jul. 3, 1996

§ 102(e) Date: Jul. 3, 1996

[87] PCT Pub. No.: WO95/10174

PCT Pub. Date: Apr. 20, 1995

[30] Foreign Application Priority Data

Aug. 10, 1993 [SE] Sweden ................... 9303291

[51] Int. Cl.[6] ............... B66F 11/00; A01B 59/00
[52] U.S. Cl. ............ 172/439; 172/272; 414/703; 280/416.2
[58] Field of Search ............... 172/47, 249, 439, 172/272, 443, 444, 451, 776; 37/231; 280/416.2; 180/53.3; 414/703, 723, 912, 920

[56] References Cited

U.S. PATENT DOCUMENTS

| | | | |
|---|---|---|---|
| 3,151,883 | 10/1964 | Stuart | 172/439 X |
| 3,231,294 | 1/1966 | Horney | 172/272 |
| 3,306,630 | 2/1967 | Weiste | 172/272 |
| 3,427,046 | 2/1969 | Sommer et al. | 280/479 |
| 3,871,463 | 3/1975 | Geisthoff | 172/272 X |
| 4,477,101 | 10/1984 | Nilsson et al. | 172/272 |
| 4,850,789 | 7/1989 | Zimmerman | 172/272 X |
| 5,026,247 | 6/1991 | Zimmerman | 172/272 X |
| 5,193,623 | 3/1993 | Burette | 172/439 X |

OTHER PUBLICATIONS

Northern Lawn and Garden Catalog, p. 6—no date.

*Primary Examiner*—Terry Lee Melius
*Assistant Examiner*—Robert Pezzuto
*Attorney, Agent, or Firm*—Robert Platt Bell & Associates, P.C.

[57] ABSTRACT

A coupling device for a tractor provided with a three point hitch. The coupling device has a first coupling frame, and a second coupling frame, provided with at least an upper and two lower fastening links for hinged fastening of a tool, the first coupling frame being provided with a first coupling element in longitudinally and directionally variable rotation connection with the rotating shaft of the tractor. The second coupling frame is provided with a second coupling element being rotatably connectable with the first coupling element, to transfer the effect of the rotating shaft to the tool. The coupling frames are provided with cooperating upper and lower fastening elements. The upper fastening element of the first coupling frame consists of two fastening hooks turned from the tractor, provided at a spaced horizontal distance from each other symmetrically from the vertical symmetric axis of the coupling frame, converging upwards towards each other. The second coupling frame comprises an upper beam element in each end limited by downwardly directed limiting elements. The fastening hooks and the beam element are formed and provided in such a way that the fastening hooks can be brought, from below, to vertically and horizontally correct coupling with the horizontal beam element, even when the first and second coupling frames are somewhat mutually twisted in a plane perpendicular to the longitudinal direction of the tractor.

10 Claims, 6 Drawing Sheets

COUPLING DEVICE AT A TRACTOR

FIELD OF THE INVENTION

The present invention relates to a coupling device at a tractor, provided with a three-points fastening for tools, with an upper top beam, with a first substantially horizontally displaceable fastening link, and two lower traction beams, with second and third substantially vertically displaceable fastening links, and a power output in the form of a substantially horizontally rotating shaft, directed in the longitudinal direction of the tractor, comprising, a first coupling frame, fastened hinged at said first and third fastening links, and a second coupling frame, provided with at least an upper (25) and two lower fastening links for hinged fastening of a tool, the first coupling frame being provided with a first coupling element in longitudinally and directionally variable rotation connection with said rotating shaft of the tractor, the second coupling frame being provided with a second coupling element being able to be connected to rotation connection with the first coupling element, to transfer the effect of said rotating shaft to the tool, the coupling frames being provided with cooperating upper and lower fastening elements.

BACKGROUND OF THE INVENTION

Several coupling devices for tractors are known. A compilation of such, utilized or just suggested is given in the Swedish Patent Application SE- 8104211-1, published as laid open publication No. 434 000 on 1984 Jul. 2nd. In this publication coupling devices of all conceivable types are described, also of the art mentioned introductorily. There is also a list of the demands for such coupling devices. Among those demands may be mentioned:

possibility to couple the tools quickly and easily, possibility to adjust the coupling easily and simply.

Among the described couplings some are very complicated and expensive, and furthermore they do not meet said two demands.

SUMMARY AND OBJECTS OF THE INVENTION

Thus the object of the invention is to provide a coupling device of the type mentioned introductorily, which is simple and relatively inexpensive in construction and manufacture, and which admits simple and safe coupling of tools to the tractor, and that can be easily adjusted according to needs.

According the invention such a coupling device is characterized primarily in that the upper fastening element of the first coupling frame consists of two fastening hooks, turned from the tractor, provided at a distance from each other symmetrically from the vertical symmetric axis of the coupling frame, converging upwards towards each other, and that the second coupling frame comprises an upper beam element, in each end limited by downwardly directed limiting elements, the fastening hooks and the beam element being formed and provided in such a way, that the fastening hooks can be brought, from below, to vertically and horizontally correct coupling with the horizontal coupling frame, also when the first and second coupling frames are somewhat mutually twisted in a plane perpendicular to the longitudinal direction of the tractor.

Advantageously the fastening hooks are formed with their limiting surfaces turned to the tractor, seen from above tilting towards the tractor.

In one suitable embodiment of the invention, the first coupling frame is formed substantially rectangular, which is advantageously also the case with the second coupling frame. Said beam element is, in one preferred embodiment, formed with a circular cylindrical outer limiting surface. The limiting element of the beam element suitable forms walls in the second coupling frame.

The fastening hooks may be formed in different ways, under the provision, that they admit said desired function in one advantageous embodiment the outer limiting surfaces of the fastening hooks, seen laterally, are convex, preferably generated by radii in a vertical plane substantially equal to the distance between said limiting elements. Of course a certain play is needed, in order that the fastening hooks and the beam element resp their limiting surfaces shall not get in binding connection.

In one further suitable embodiment of the coupling device according to the invention, the lower cooperating fastening elements of the coupling frames comprise guide elements, provided at the first coupling frame to guide correctly the fastening elements of the second coupling frame to engagement with the fastening elements of the first coupling frame.

In one further embodiment, that may be suitable in some cases, the lower fastening links of the second coupling frame are formed by bushings provided in the lower part of the limiting elements, through which a shaft at the tool is attached to form a substantially rectangular unit.

BRIEF DESCRIPTION OF THE DRAWINGS

The invention shall be described more in detail in the following, reference being made to the enclosed figures, of which.

DETAILED DESCRIPTION OF THE DRAWINGS

Figure 1A:
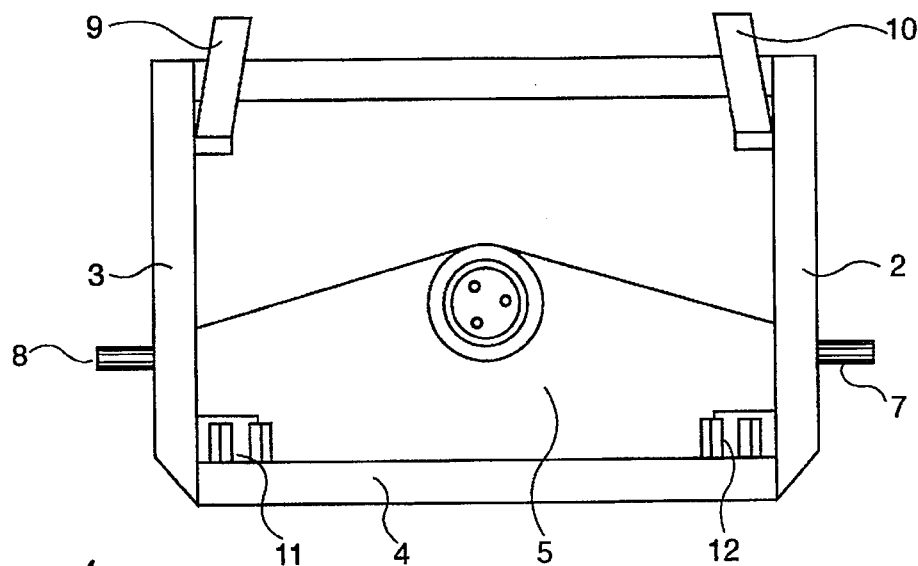
FIGS. 1a–c schematically show an embodiment of the first coupling frame according to the invention, in a view towards the tractor, a view from the side resp a view from the tractor, FIG 2a schematically shows the coupling frame in FIG. 1, in perspective towards the tractor, FIG. 2b schematically shows a detail in FIG. 2a in an alternative form, FIG. 3 schematically shows the coupling frame in FIG. 1, in perspective from the tractor, FIG. 4a–c schematically show an embodiment of a second coupling frame according to the invention, FIG. 4a showing a perspective view from the tractor, 4b a view from the side and 4c shows a perspective view towards the tractor, FIG. 5 schematically shows a special embodiment of a first and a second coupling element, FIG. 6 schematically shows an adaption element for the second coupling device, FIGS. 7a–b schematically show an embodiment of the second coupling frame with a detail of the lower fastening link, FIG. 8 schematically shows a three-part cardan shaft for the transmission of rotation movement.
Figure 1B:
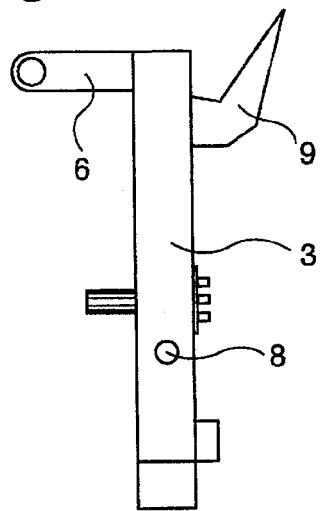
Figure 1C:
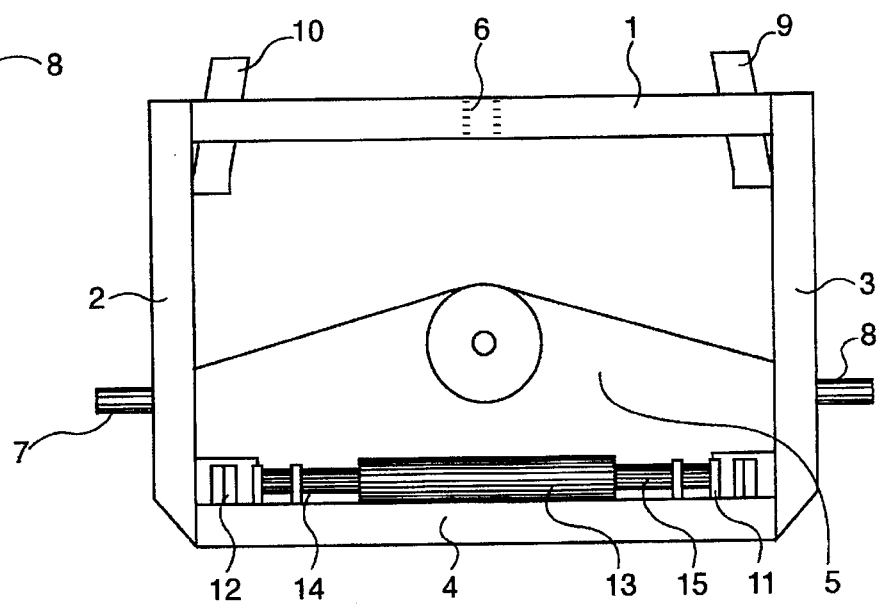
Figures 2A, 2B:
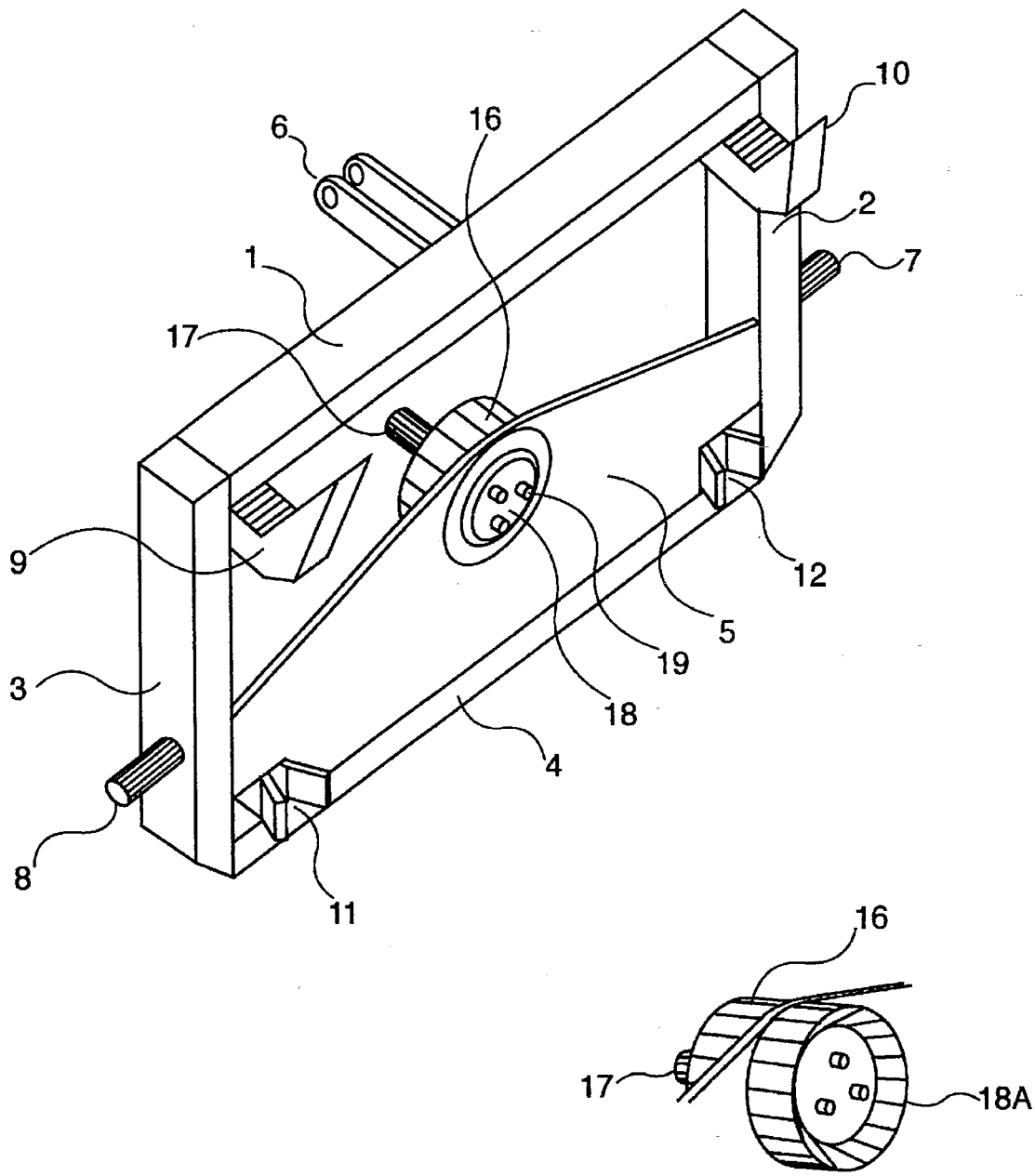
Figure 3:
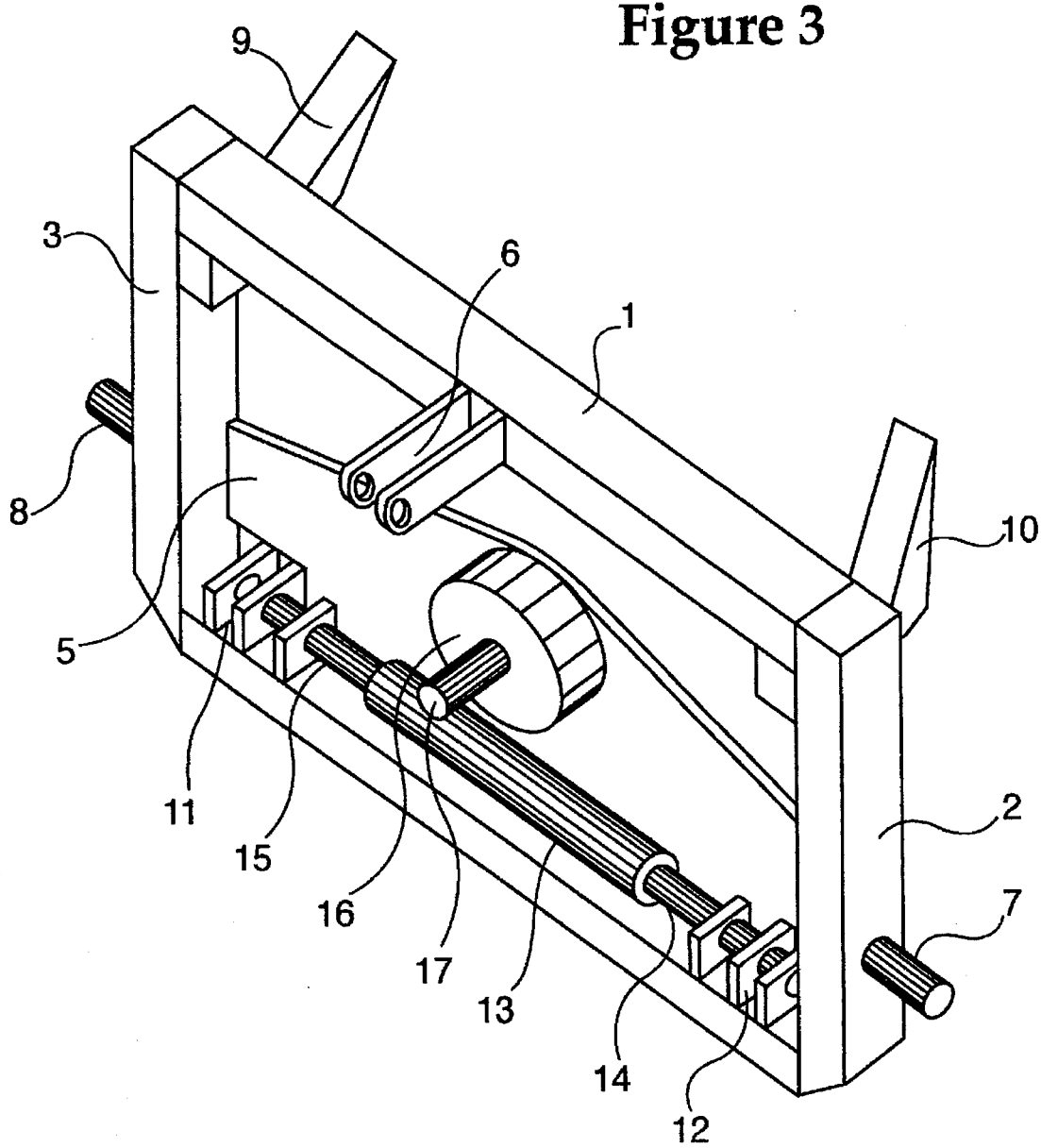

As is obvious from FIGS. 1a–c, 2a and 3a rectangular first coupling frame is formed by an upper beam 1, two side beams 2 and 3 and a lower beam 4. A supporting plate 5 is inserted between the side beams and the lower beam. In the upper beam a fastening device 6 is provided for hinged connection with the fastening hinge on the upper top beam of the tractor, which is horizontally displaceable via a hydraulic device. From the side beams two link taps 7 and 8 protrude, intended to be connected, hinged, to the fastening hinges of the traction beams of the tractor. The traction beams are vertically displaceable by corresponding hydraulic devices. At the upper portion of the coupling frame, that is to say in the corners formed by the upper beam 1 and resp side beams 2 and 3, two fastening hooks are attached, converging towards each other upwardly. They are also so formed, that their limiting surfaces towards the tractor show an inclination seen from above and towards the tractor. In the lower portion of the coupling frame, at the corners formed by the lower beam 4 and the side beams 2 an3 there are provided guides 11 and 12, at the side turned from the tractor, which lead into holes made in the support plate 5. At the other side of the support plate there is a hydraulic device 13 with two pistons 14,15 attached to the lower beam 4. At the support plate a first coupling element 16 is provided, comprising a shaft tap 17, intended to be connected to a not shown rotation connection, longitudinally and directionally variable, to the power output of the tractor, in the form of a rotating shaft. The coupling element is provided, at the side turned from the tractor, with a first coupling means 18 with three pins 19, springloaded from within. In FIG. 2b an alternative embodiment of the first coupling means is shown marked 18A.

Figure 4A:
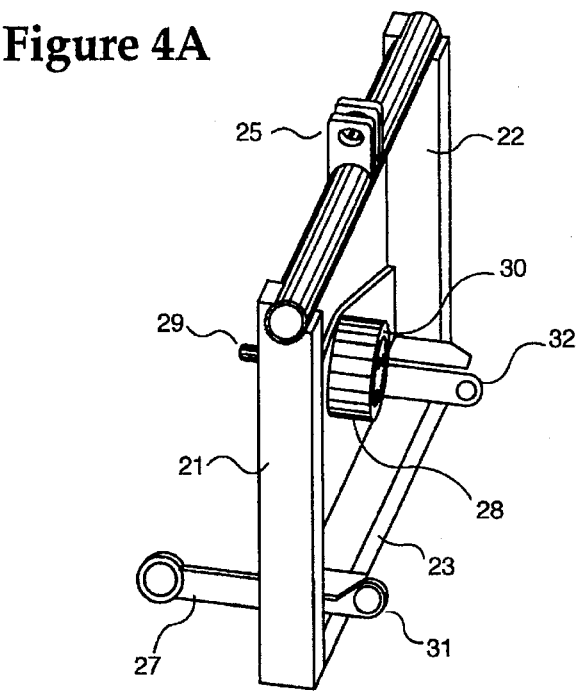
Figure 4B:
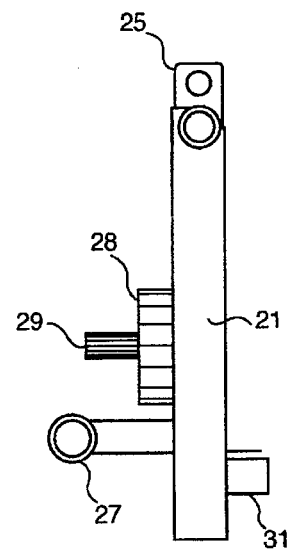
Figure 4C:
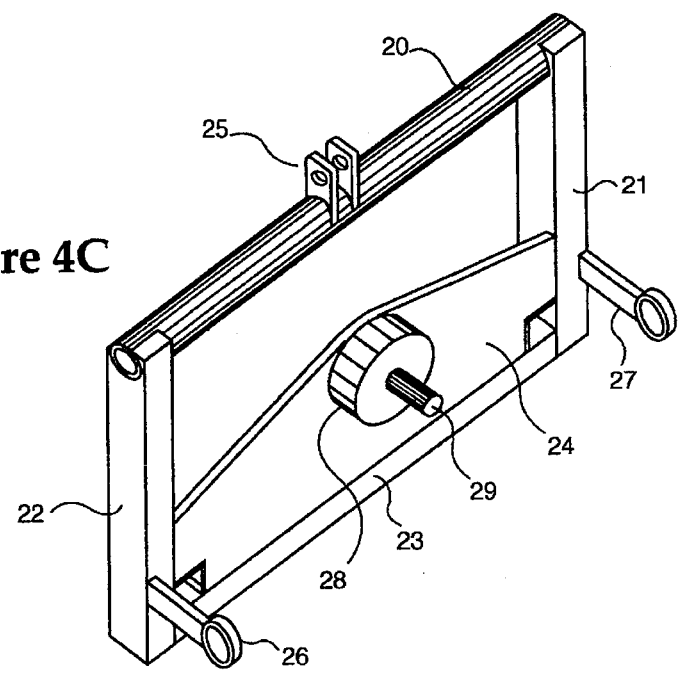

In FIG. 4a to c a second coupling frame is shown, intended to be attached to the tool. It also shows a rectangular form and is formed by an upper horizontal beam element 20, which shows a circular cylindrical outer surface, at the sides connected to two side beams 21 and 22, which in turn carry a lower beam 23. A support plate 24 is inserted between the lower beam 23 and the side beams 21 and 22. An upper fastening device 25 is mounted at the middle of the beam element 20 and lower fastening devices 26 and 27 are fastened to the lower portions of side beams 21 and 22. The fastening devices 25,26 and 27 are intended to be fastened, hinged at corresponding means at the tool. The support plate 24 carries a second coupling element 28, comprising a shaft tap 29 intended to transfer, after coupling of the first and the second coupling element, of the rotating effect of the tractor to the tool. The second coupling element is, at its side turned from the shaft tap 29, provided with a second coupling means 30, intended to cooperate with the coupling means at the first coupling frame to transfer the rotation movement. The coupling means can be provided with cooperating guide means to be connected safely also in cases of a certain excentricity, as has been indicated in FIG. 2b.

The second coupling frame is, at the lower portions of the side beams, provided with fastening cantilevers 31 and 32, intended to be guided by said guides 11 and 12 at the first coupling frame, when the first and second coupling frames are connected, to such a position in relationship, to said pistons 14 and 15, that these, when said hydraulic device is activated, will lock the the first coupling frame at the second one at the lower portion.

Figure 5:
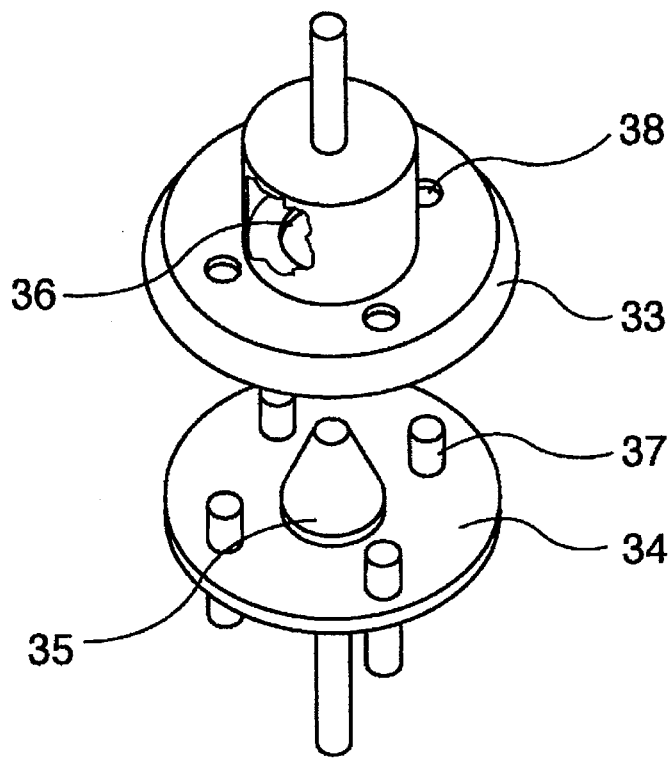

In FIG. 5 a special, advantageous embodiment of the first and second coupling elements is shown. One of these, marked 33, has a central hole 36 and four more circumferentially arranged holes 38, whilst the second coupling element marked 34 is provided with a central, guiding cone 35 and four taps 37, corresponding to the holes 38.

Figure 6:
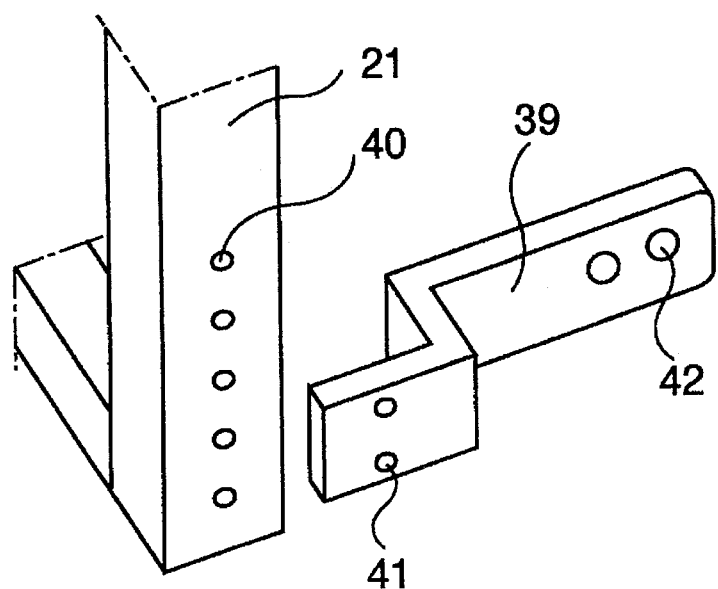

In order to adapt the second coupling frame with its side beams 21,22 to its tool, an adaption element 39, shown in FIG. 6 can be used. The adaption element 39 is formed, as is seen, as a double folded iron piece with holes 41 for fastening into the corresponding holes 40 of the side beam 21 by aid of bolts or the like. The holes 42 shown are intended for fastening at the tool used. This adaption element can, is is obvious, be turned inwardly or outwardly, which admits adaption to tools showing different widths.

The coupling device according to the invention thus operates in such a way, that the first coupling device is attached to the three fastening points of a tractor, whereupon a device with at least two cardan links is is provided to connect, longitudinally and directionally variable, the power output of the tractor in the form of a rotating shaft, to the shaft tap 17 at the first coupling tap. The second coupling frame is mounted in a corresponding way, to the tool, that is under view. Of course it is advantageous to have a set of second coupling frames available fo the number of tools, that is intended to be used at a certain period of the cultivation year. The tractor is reversed towards the tool, so that the fastening hooks 9 and 10 are moved in under the beam element 20 to lift this. Also if the first and second coupling frames would be somewhat twisted in a plane perpendicular to the longitudinal direction of the tractor the beam element and the fastening hooks will be brought into the correct mutual position vertically and horizontally due to the form of the fastening hooks.

Figure 7A:
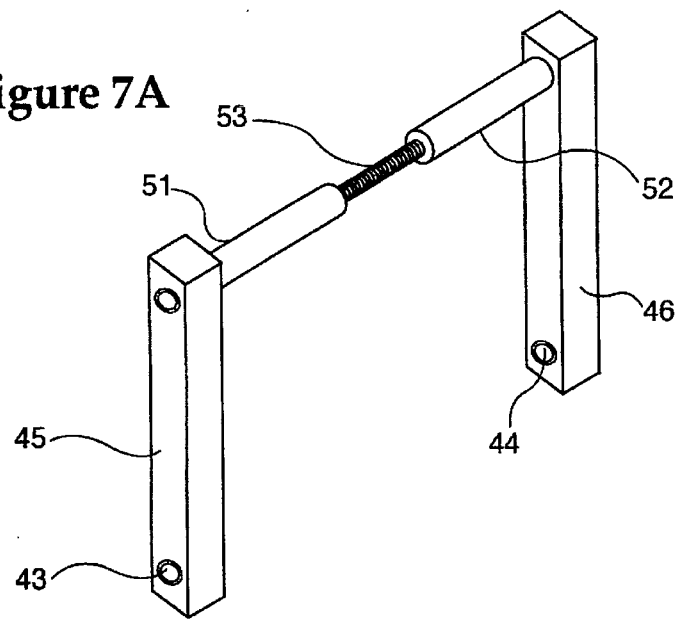
Figure 7B:
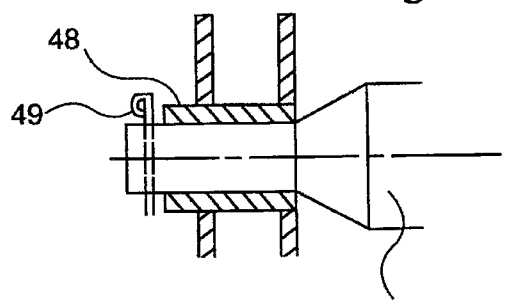

In FIGS. 7a and 7b an alternative embodiment is shown of the second coupling frame, where the lower fastening hinges 43,44 form bushings in the lower portions of the limiting elements 45,46, through which a shaft at the tool is attached by collets 48 and cotters 49. This fastening is made possible in that the upper horizontal beam element of the coupling frame in this case is formed longitudinally variable and consists of two beam portions 51 and 52, which are internally threaded with opposite pitch, in order that the turning of a shaft 53, threaded externally in the corresponding way, varies the length of the upper beam element.

Figure 8:
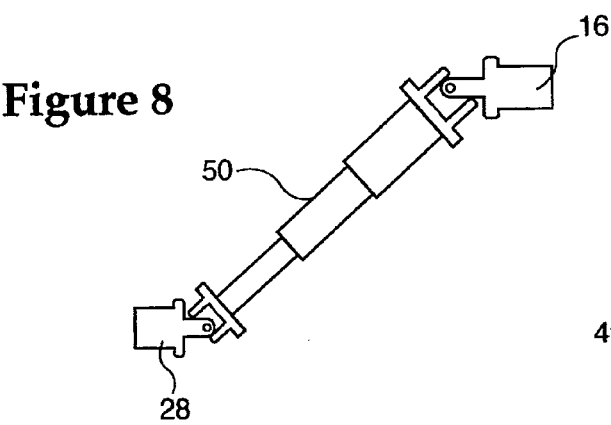

In FIG. 8 there is shown a three-part cardan shaft 50 for the flexible transfer of a rotation movement between a first coupling element 16 and a second coupling element 28.

I claim:

1. A coupling device for a coupling a tool to a tractor provided with a three point hitch, the three-point hitch comprising an upper beam, with a first substantially horizontally displacable fastening link, and two lower traction beams, with second and third substantially vertically displacable fastening links, and a power output in the form of a substantially horizontally rotating shaft, directed in the longitudinal direction of the tractor, said coupling device comprising:

a first coupling frame, fastened hinged at said first and third fastening links of the three point hitch, said first coupling frame provided with a longitudinally and directionally variable motion first connecting element connected with said horizontally rotating shaft of said three point hitch, and a second coupling frame, provided with at least an upper and two lower fastening links for hinged fastening to the tool, said second coupling frame being provided with a second coupling element connectable to rotation connection with the first coupling element, to transfer rotary motion of said horizontally rotating shaft to the tool, wherein said first and second coupling frames are provided with cooperating upper and lower fastening elements, an upper fastening element of the first coupling frame comprises two fastening hooks turned from the tractor, provided at a spaced horizontal distance from each other symmetrically from the vertical symmetric axis of the coupling frame, converging upwards towards each other, and an upper fastening element of the second coupling frame comprises a horizontal upper beam element in each end limited by downwardly directed limiting elements, the fastening hooks and the beam element being formed and provided in such a way, that the fastening hooks can be brought, from below, to vertically and horizontally correct coupling with the horizontal beam element when the first and second coupling frames are substantially mutually twisted in a plane perpendicular to the longitudinal direction of the tractor.

2. The coupling device of claim 1, characterized in that the fastening hooks are formed with their limiting surfaces turned to the tractor, tilting towards the tractor.

3. The coupling device of claim 2, characterized in that the coupling frames are substantially rectangular.

4. The coupling device of claim 3, characterized in that said beam element has a circular cylindrical outer limiting surface.

5. The coupling device of claim 4, characterized in that said limiting elements form sides in the second coupling frame.

6. The coupling device of claim 5, characterized in that the limiting surfaces of the fastening hooks are convex generated in a vertical plane by radii substantially equal to the distance between said limiting elements.

7. The coupling device of claim 6, characterized in that lower cooperating fastening elements of the coupling frames comprise guide elements provided at the first coupling frame to correctly guide fastening elements of the second coupling frame to engagement with the fastening elements of the first coupling frame.

8. The coupling device of claim 7, characterized in that the two lower fastening links of the second coupling frame are formed by bushings provided in the lower part of the limiting elements, through which a shaft at the tool is attached.

9. The coupling device of claim 8, characterized in that the first coupling element is connected to the second coupling element by a three-part cardan shaft.

10. The coupling device of claim 9, wherein said first coupling element further comprises a hydraulic cylinder driving at least one piston, and said second coupling element comprises at least on locking ring for receiving the at least one piston when said first coupling element is coupled to said second coupling element, wherein said at least one piston and said at least one locking ring, when engaged, lock said first coupling element to said second coupling element.

* * * * *